Dec. 18, 1928.

G. H. LANG

PRINTING MACHINE

Filed Nov. 7, 1925

Inventor.
George H. Lang
by Heard Smith & Tennant
Attys.

Dec. 18, 1928.

G. H. LANG

PRINTING MACHINE

Filed Nov. 7, 1925

Inventor.
George H. Lang
by Heard Smith & Tennant.
Attys.

Dec. 18, 1928.
G. H. LANG
1,695,964
PRINTING MACHINE
Filed Nov. 7, 1925    4 Sheets-Sheet 3
Fig. 8.
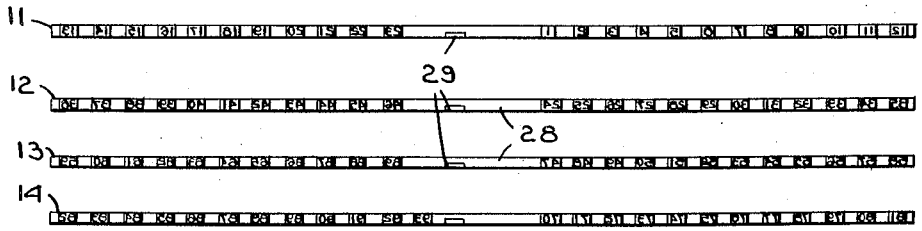
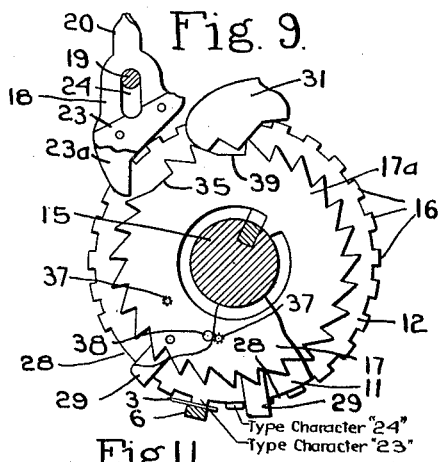
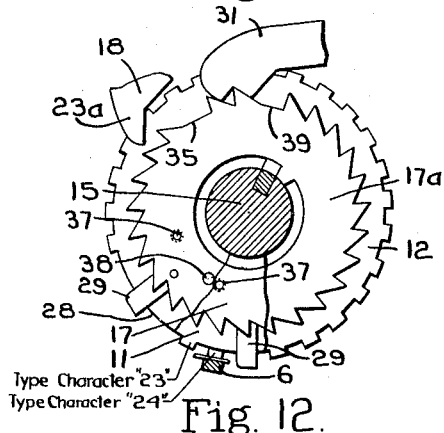
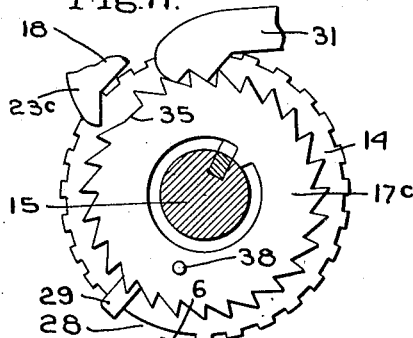
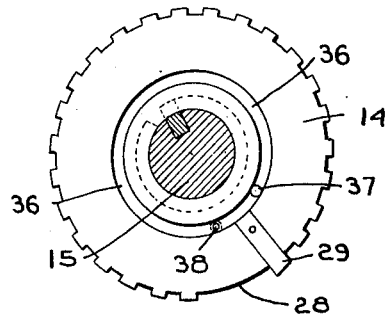
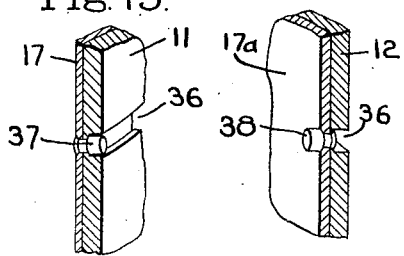
Inventor
George H. Lang
by Heard Smith & Tennant.
Attys Dec. 18, 1928. 1,695,964
G. H. LANG
PRINTING MACHINE
Filed Nov. 7, 1925 4 Sheets-Sheet 4
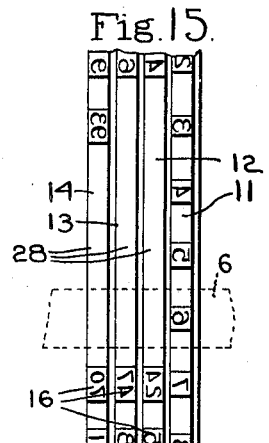
Fig. 15.
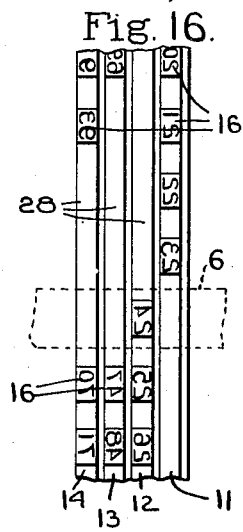
Fig. 16.
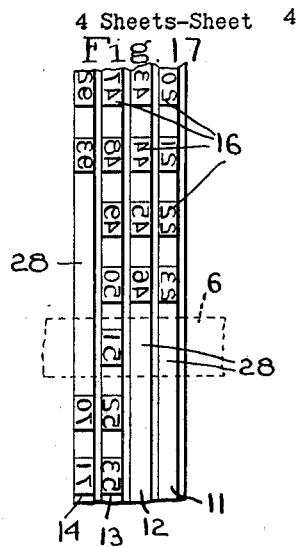
Fig. 17.
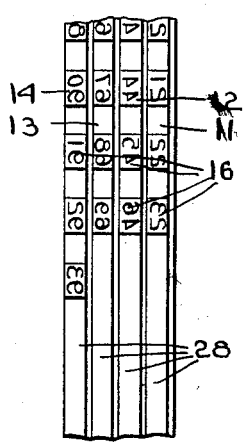
Fig. 18.
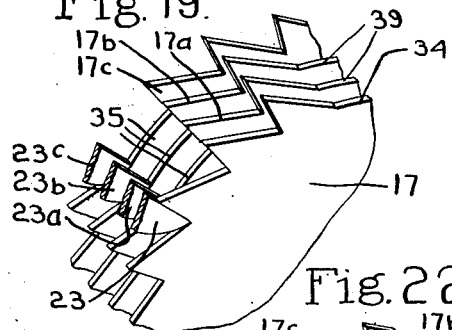
Fig. 19.
Fig. 20.
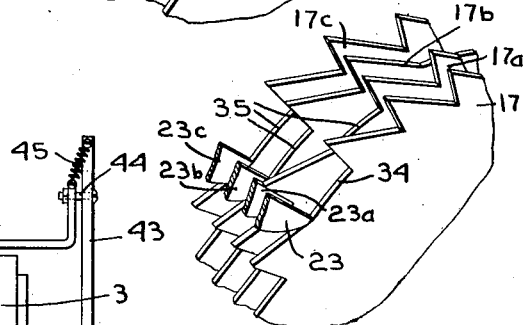
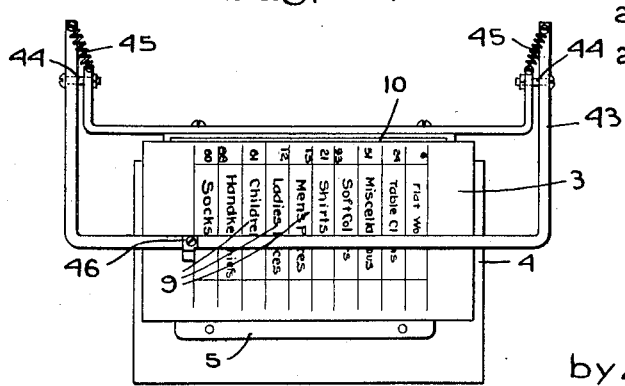
Fig. 22.
Inventor.
George H. Lang
by Heard Smith & Tennant.
Attys Patented Dec. 18, 1928.

1,695,964

UNITED STATES PATENT OFFICE.

GEORGE H. LANG, OF BOSTON, MASSACHUSETTS.

PRINTING MACHINE.

Application filed November 7, 1925. Serial No. 67,503.

This invention relates to a printing machine of the type adapted to print on a prepared list of different articles the number of each article. While the invention is capable of various uses yet it is specially useful in making up laundry lists.

It is the common practice for different families or different concerns to send to a laundry bundles made up of different articles of clothing. When each bundle or family wash arrives at the laundry a clerk has to check it over and list the articles in the bundle and obtain the quantity of each article. There may be in any one bundle several sheets, pillow cases, handkerchiefs, socks, etc., there usually being a different number of each article. As each bundle is received in the laundry the articles therein are listed by a clerk who writes on a prepared list the number of each article.

The present invention has for its object to provide a novel machine for thus listing the article and in some respects it is an improvement upon the devices illustrated in my Patents No. 1,103,063, July 14th, 1914 and No. 1,352,070, September 7th, 1920.

These devices comprise a plurality of numbering wheels or type wheels, one for each article, each wheel having an actuator by which it may be stepped forward intermittently. The actuators are labelled to correspond to the different articles on the list and in using the device the operator sorts the laundry by grouping together all the articles of each kind and then after counting the number of each article the corresponding actuator will be actuated a number of times equal to the number of articles which will step forward the corresponding printing wheel into position to print this number. This operation is carried out for each of the various articles in the bundle and when the type wheels have all been set the machine is actuated to print on the laundry list the complete contents of the bundle or family wash.

In the devices of the above-mentioned patents there is only one printing wheel for each article and the number of any one kind of articles which could be indicated was thus limited by the size of the printing wheel.

It is one of the objects of the present invention to provide an improved listing machine of this type which has a larger capacity than those of the patented devices in that it can print on the laundry list a figure indicating the number of any one kind of article in the wash which is considerably higher than that which would be possible with the use of a single type wheel. This is accomplished by employing a group of type wheels for each article, one type wheel bearing printing characters adapted to print numerals from "1" up to a certain figure and the next wheel having characters to print another group of consecutive numerals higher than those on the first-named wheel and so on. For instance, merely for illustration it may be assumed that there are four type wheels in a group and that the first wheel will have printing characters thereon adapted to print the numerals "1" to "23", the next wheel will have printing characters thereon adapted to print the numerals "24" to "46", the third printing wheel will have type characters thereon adapted to print numerals from "47" to "69" and the fourth type wheel will print from "70" to "93".

The printing wheels are thus arranged in groups, each group corresponding to a particular article. A common actuator device is provided for each group of wheels and the construction is such that the repeated operations of the actuator will operate first to step forward intermittently the first printing wheel of the group, the other printing wheels remaining idle and inoperative, and when by repeated actuations the first printing wheel has been turned to its limit then during further actuations of the actuating device the second printing wheel will be operated while all the other wheels will remain stationary. When the second wheel has been carried to the limit of its movement then further actuations of the actuating device will operate the third printing wheel and so on. If, therefore, the number of any one kind of article, such for instance as handkerchiefs, is a number which is carried by the third printing wheel of the corresponding group, then as the operator counts the handkerchiefs and gives the actuator one actuation for each handkerchief counted, the repeated actuations will advance the first wheel to the limit of its movement and then the second wheel will be picked up and fed forward intermittently to the limit of its movement and then the third wheel will be picked up and fed forward intermittently until it is set to print the number of the handkerchiefs in the wash. By thus employing a plurality of type wheels for each article it is possible to increase the capacity of the machine very greatly and to provide a machine by which laundry bundles containing large numbers of any one kind of article may be listed.

In order to give an understanding of the invention I have illustrated in the drawings a selected embodiment thereof which will now be described after which the novel features will be pointed out in the appended claims.

Fig. 8 is a diagrammatic view indicating the arrangement of numerals on a group of four type wheels adapted to print any numeral from 1 to 93;

Fig. 9 is a view showing the second type wheel of the group in the position it occupies while the first type wheel is being actuated.

Fig. 10 is a similar view showing the second type wheels advanced forward one step;

Fig. 11 is a view showing the last type wheel of the group in its non-printing position;

Fig. 12 is a view showing the reverse side of the type wheel from that shown in Figs. 9 to 11;

Figs. 13 and 14 are fragmentary sectional views of the two adjacent type wheels showing the carrying mechanism which shifts the action from one type wheel to the other;

Fig. 15 is a fragmentary face view of a group of four type wheels showing the first type wheel set to print the numeral 6;

Fig. 16 is a similar view showing the type wheels set to print the numeral 24;

Fig. 17 is a similar view showing the type wheels set to print the numeral 51;

Fig. 18 is a similar view showing the type wheel set to print the numeral 93;

Fig. 19 is a fragmentary perspective view of the ratchet wheels for a set of type wheels, said view showing a portion of the actuator illustrating how it operates on one type wheel of a group only;

Fig. 20 is a plan view of the platen on which the laundry list is supported illustrating the work holder;

Fig. 22 is a view similar to Fig. 19 showing the position of the parts when the type wheel 12 is being actuated.

Figure 1:
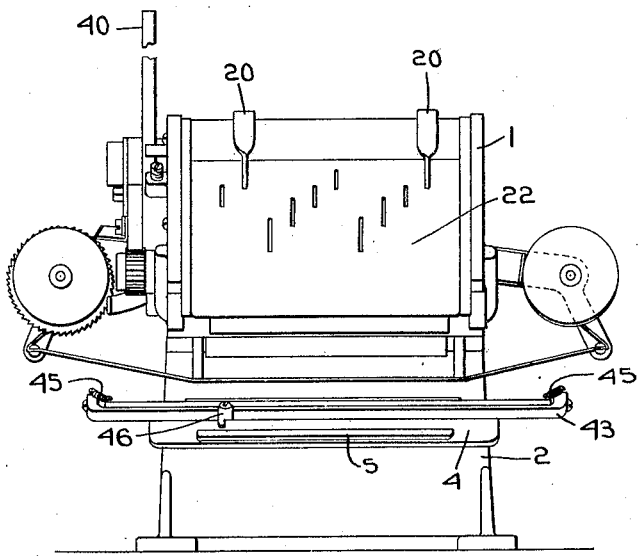
Fig. 1 is a front view of a machine embodying my invention.
Figures 2, 21:
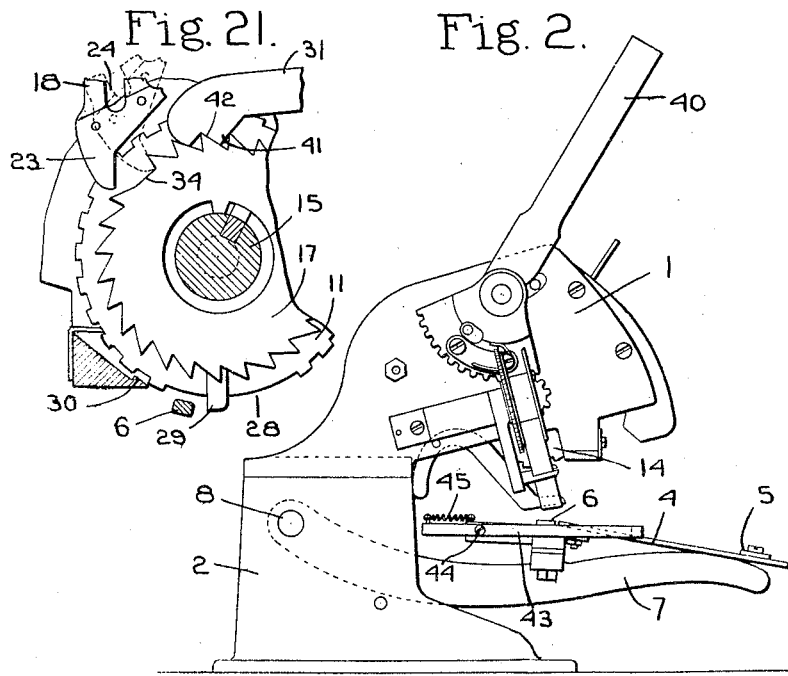
Fig. 2 is a side view thereof.
Fig. 21 is a view similar to Fig. 9 but showing the type wheel 11 at the limit of its forward movement.

A machine embodying my invention is illustrated generally in Figs. 1 and 2 and it comprises a head 1 in which the type wheels are rotatively mounted, this head being carried on a base 2. The list or sheet 3 to be printed is supported on a table or work support 4 which is provided with a gauge 5 by which the sheet 4 is properly positioned. This work support is formed with a platen portion 6 which supports the part of the list or sheet 3 on which the figures are to be printed and which forms with the printing wheels a printing couple. The work support is carried by a swinging frame 7 pivoted to the base at 8 and in operation after the type wheels have been properly set and the list 3 is placed on the platen the latter is raised up to bring the sheet against the type wheels thereby to print the desired data thereon.

Inasmuch as this invention has been designed primarily for use in printing laundry lists I have illustrated in Fig. 20 such a laundry list on which is printed at 9 the names of various articles of laundry, such as "flat work," "tablecloths," "miscellaneous," "soft collars," "shirts," etc. At one edge of the list 3 is a column 10 in which is to be printed the number of each of the articles mentioned on the list and which is contained in any bundle of laundry. When the sheet or list 3 is placed on the table the portion containing the column 10 will rest on the platen portion 6 so that when the machine has been properly set and is then actuated the correct numbers will be printed in the column 10. The above is a general description of the operation of the device, which, however, is more fully set forth in the above-mentioned patents.

In my present invention I purpose to employ a plurality or group of type wheels for marking on the sheet 3 the number of any article that is likely to be found in large numbers in any individual wash. The number of type wheels in each group will vary according to the demands of use and each group may have two, three, four, five or any number of type wheels. Merely as illustrating the invention I have shown herein a group of four type wheels. The number of numerals on any individual type wheel may also vary and merely for illustrative purposes I have shown an arrangement wherein each type wheel contains twenty-three different numerals, the first type wheel of a group of four containing type characters adapted to print from "1" to "23" and the second type wheel containing type characters adapted to print from "24" to "46", the third containing type characters adapted to print from "47" to "69" and the fourth containing type characters adapted to print from "70" to "93." The four type wheels of the group are indicated at 11, 12, 13 and 14 respectively. These type wheels as well as all the other type wheels of the group are rotatively mounted on a shaft 15 which is carried by the head 1 and each type wheel has on its periphery type characters indicated at 16, all as shown in the above-mentioned patents.

Each type wheel has associated therewith a ratchet member with which co-operates an actuating pawl to step the type wheel forward. The ratchet members for the type wheels 11, 12, 13 and 14 are designated 17, 17ª, 17ᵇ and 17ᶜ respectively. The teeth on the ratchet wheels have the same angular spacing as the type characters 16. The actuating pawl for one of the groups of type wheels is indicated at 18 and it is mounted on a rod 19 carried by the head 1, all as described in the above-mentioned patents. This pawl has a thumb piece 20 which extends through a slot 21 in the front 22 of the head and said pawl has at its lower end a plurality of toes, one for each ratchet wheel, said toes being designated 23, 23ª, 23ᵇ and 23ᶜ. Said pawl is also provided with a slot 24 so that it can have both a rocking movement and a withdrawing movement. The pawl is acted on by a spring 25 which normally holds it in the position shown in Fig. 3 and the operation of stepping a type wheel forward one step consists in depressing the finger piece 20 into the position shown in Fig. 4 thus bringing the toe of the pawl into engagement with a ratchet tooth and turning the ratchet forward one step. The turning movement is limited by the engagement of the portion 26 of the pawl with a rod 19 adjacent the one on which the pawl is mounted as shown in Fig. 4. When the pressure on the thumb piece is released the spring 25 will return the pawl to its normal position shown in Fig. 3. This operation of the actuating member is the same as that described in my above-mentioned patents.

In my present invention there is one actuator for each group of type wheels and, as stated above, the construction is such that upon repeated actuating movements of the actuator it will operate first to step forward the type wheel 11 of the group without moving the other type wheels until said type wheel 11 has been moved to the limit of its movement and then it will pick up the second type wheel 12 and feed that forward and so on.

Figures 5, 6:
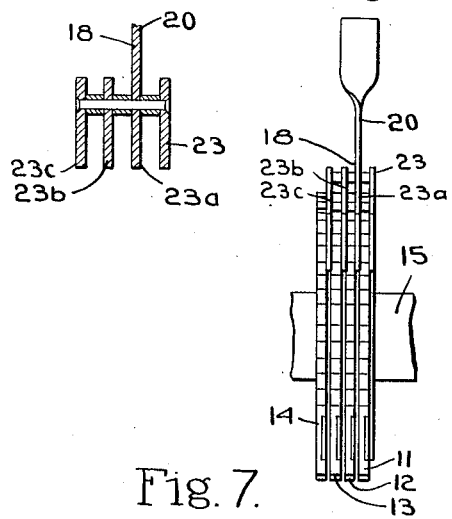
Fig. 5 is a fragmentary front view of one group of type wheels and the common actuator therefor.
Fig. 6 is a sectional view of the actuator on the line 6—6, Fig. 4.

The type wheels of any group are placed closely together as shown in Fig. 5, the type wheels being separated slightly by the interposed ratchet wheels. As stated above the actuator 18 for any group of type wheels is provided with a plurality of toes, one for each type wheel, said toes being designated 23, 23ª, 23ᵇ and 23ᶜ. The ratchet wheels are slightly smaller than the type wheels and the toes of the actuating pawl are constructed to enter the spaces 27 between the type wheels which are occupied by the ratchet wheels.

The type characters 16 do not extend around the complete periphery of the type wheels, each type wheel having on its periphery a space 28 which is free from the type characters.

Figure 3:
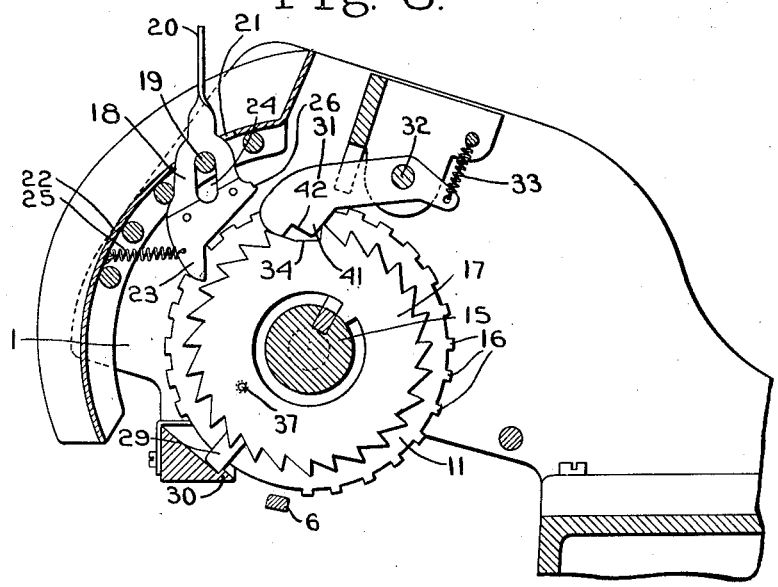
Fig. 3 is a fragmentary sectional view showing one of the type wheels of a group and its actuating mechanism, the type wheel being shown in non-printing position.
Figure 4:
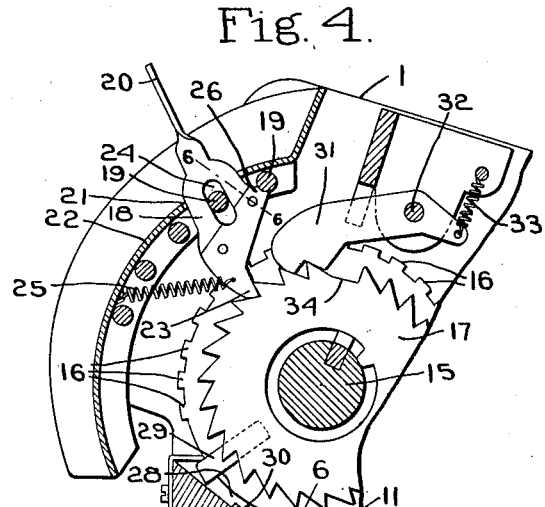
Fig. 4 is a similar view showing the type wheel advanced and set for printing.
Figure 7:
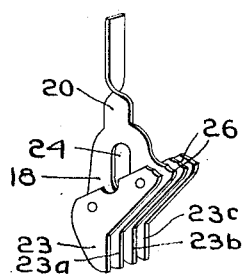
Fig. 7 is a perspective view of the actuator for a group of four type wheels.

Each type wheel has also associated therewith a stop finger 29 adapted to engage a stop shoulder 30 formed on the head 1 and when the stop finger is in engagement with the shoulder, as shown in Fig. 3, the type wheel will be in its zero position with the blank space 28 directly above the platen 6. When the type wheels are in this position no printing impression will be made. Each type wheel is yieldingly held in any adjusted position by means of a retaining member 31 in the form of a retaining pawl which is pivoted at 32 to the head and is acted upon by a spring 33 which yieldingly holds it against the teeth.

As stated above means are provided whereby when each actuator is operated repeatedly it will step the various type wheels of the corresponding group forward successively.

The ratchet wheel 17 for the first type wheel 11 of the group is provided with a gap or space 34 in which a tooth is omitted. When during rotation of the type wheel 11 the blank space 34 is brought around underneath the toe 23 of the actuating pawl, as shown in Fig. 21, then during further operation of the pawl 18 said toe will simply play back and forth idly in the blank space 34 and will not advance the type wheel any further. This blank space 34 is so positioned that it will come into the position shown in Fig. 21 when the type wheel 11 has been turned to carry the type character 23 just beyond the printing position.

The ratchet wheels 17ª, 17ᵇ and 17ᶜ for the type wheels 12, 13, 14 each have a blank space 35 formed therein and these blank spaces 35 are so positioned that when the type wheels 12, 13 and 14 are in their zero position the blank spaces will be at the point where the toes 23, 23ª, 23ᵇ of the pawl is operating. Consequently so long as the type wheels 12, 13 and 14 are in their zero position the operation of the actuator 18 will not advance said type wheel as the corresponding toes of the pawl will simply idle in the blank spaces 35.

Fig. 15 is a fragmentary view of the type wheels of a group showing the type wheel 11 set to print the numeral "6" and the other type wheels in zero or non-printing position. In this Fig. 15 and also in Figs. 16, 17 and 18 the position of the platen relative to the type wheels is indicated in dotted lines, the type characters that are beneath the dotted lines being those that are in printing position.

Means are provided whereby when the first type wheel 11 is moved from a position to print the numeral "23" to the non-printing position in which the type character "23" is carried one step beyond the printing position, as shown in Fig. 16, the type wheel 12 will be advanced one step. This step forward of the type wheel 12 which is derived from the last forward step of the type wheel 11 will bring the first tooth of the ratchet 17ª into position to be engaged by its nose 23ª of the actuator so that during subsequent operations of the actuator the type wheel 12 will be advanced forward step by step. As stated above the last forward step of the type wheel 11 by which the type wheel 12 is set in operation brings the blank space 34 of the ratchet wheel 17 on the type wheel 11 beneath the nose 23 of the actuator so that the type wheel 11 will be unaffected by the subsequent actuations of the actuator 18.

The means herein shown for advancing the type wheel 12 one step during the last forward step of the type wheel 11 is shown in Figs. 13 and 14. The type wheel 11 has an annular groove 36 formed in its face which is adjacent the type wheel 12, said groove having a pin or projection 37 therein. The ratchet 17ª for the type wheel 12 has projecting from its face a pin or projection 38 which operates in the groove 36. These projections 37 and 38 are so disposed that when the type wheel 11 has been rotated into a position for printing the numeral "23", the pin 37 will be brought up against the pin 38 as shown in Fig. 9 and, therefore, the next forward step of the type wheel 11 which carries the type characters "23" out of printing position will result in advancing the type wheel 12 one step thereby to bring its printing character "24" into printing position as shown in Figs. 10 and 16. This also operates to bring the teeth of the ratchet wheel 17ª for the type wheel 12 into position to be operated on by the toe 23ª of the actuator as seen in Fig. 10 and brings the blank space 34 for the ratchet wheel 17 into position beneath the actuator, as seen in Fig. 21, so that during subsequent actuations of the actuator 18 the second type wheel 12 is advanced while the type wheel 11 as well as the type wheels 13 and 14 are stationary.

The ratchet 17ª for the type wheel 12 is provided with a second blank space 39 which corresponds to the blank space 34 of the ratchet wheel 17 and which is so situated that it will be brought underneath the nose 23ª of the actuator by the movement which carries the printing character "46" of the second type wheel 12 from printing position to non-printing position and brings the blank space 28 of the type wheel 12 over the plate 6. Fig. 17 shows the type wheel 12 in this position and also shows the type wheel 13 in position to print the numeral "51." During this last forward step of the printing wheel 12 the printing wheel 13 will be advanced one step to carry its printing character "47" into printing position as above described, this being accomplished by a carrying mechanism similar to that illustrated in Figs. 13 and 14. In a similar way when the type wheel 13 has been advanced to bring its type character "69" into printing position then on the next advance movement of the type wheel 13 it will move the type wheel 14 forward one step to bring the printing character "70" into printing position, the same movement of the type wheel 13 carrying the printing character "69" out of printing position and bringing the blank space 28 of the type wheel 13 over the platen 6.

Fig. 19 illustrates the relative position of the ratchet wheels 17, 17ª, 17ᵇ and 17ᶜ while the first type wheel 11 is being advanced, it being noted that the toe 23 is engaging the teeth 16 of the ratchet wheel 17 while the other toes 23ª, 23ᵇ and 23ᶜ are operating in the blank spaces 35 of the other ratchet wheel 17ª, 17ᵇ and 17ᶜ and this condition continues until the type wheel 11 has been carried into the position shown in Fig. 16, at which time the type wheel 12 is advanced one step and thereafter the relative position of the ratchet wheels 17, 17ª, 17ᵇ and 17ᶜ, is as shown in Fig. 22 that is, the toe 23ª will be co-operating with the ratchet teeth of the ratchet wheel 17ª while the other toes 23, 23ᵇ and 23ᶜ will be operating in the blank spaces of the ratchets 17, 17ᵇ and 17ᶜ.

When the type wheel 12 has been advanced to the limit of its movement then the ratchet wheel 17ᵇ will be picked up and carried forward, the other ratchet wheels remaining idle.

It will thus be seen that with my apparatus only one type wheel at a time is operated and that the type wheels are actuated successively, one type wheel being stepped forward until it reaches the limit of its printing capacity and then the next type wheel having thereon the next higher number is picked up and stepped forward until it reaches the limit of its printing capacity when the action is transferred to the next type wheel and so on. By this means it is possible to use relatively small type wheels and yet to print high numbers.

After the type wheels have been set to print the desired number and the printing operations has been accomplished by raising the platen against the printing wheels then the type wheels are reset to their zero position by means of a resetting lever 40, all as shown in the above-mentioned patents.

Each retaining pawl 31 is so shaped that it co-operates either with a single ratchet tooth 16 or with one of the blank spaces. Each pawl has a wide nose 41 adapted to fit one of the blank spaces and this nose is provided with a re-entrant portion or notch 42 which co-operates with a ratchet tooth as shown in Fig. 4.

The sheet 3 to be marked is held on the table by means of a bail-shaped hold-down member 43 which is pivotally mounted at 44 and is acted on by springs 45 which yieldingly hold it in operative position. The sheet may be placed on the table 4 by simply raising the bail-shaped member and slipping the sheet under it. The bridge portion of the bail-shaped member extends longitudinally of the sheet 4 and thus holds it yieldingly in its operative position.

This hold-down member carries an adjustable indicator 46 which serves to assist the operator in properly positioning the slip 3. This indicator is adjustably mounted on the hold-down and is in the form of a finger. In use it is so adjusted that when the slip 3 is properly positioned the finger will come over or up in line with one of the horizontal lines on the slip. This enables the operator to place the slip on the table so that the type wheels for the various articles will make their imprint in the proper place on the slip.

The actuator herein shown is constructed so that it may be operated to advance the type wheel forwardly or backwardly all as described in my Patent No. 1,352,070, September 7th, 1920. When the actuator is swung from the position shown in Fig. 3 to that shown in Fig. 4 it will step the type wheel forward one step. If, however, the actuator, when in the position shown in Fig. 3, is raised and then is tipped forwardly to bring the nose above the tooth and is then pushed downwardly and at the same time the upper end is forced backwardly the type wheel will be set backwardly all as referred to in the above-mentioned patent. This is a considerable advantage because it enables an operator to set a wheel back one or more steps to correct a mistake which involves overrunning instead of being compelled to reset the type wheel to zero position and start over again.

I claim:

1. In a listing machine, the combination with a plurality of type wheels, of an actuator therefor, and means whereby upon successive operations of the actuator first one and then another type wheel will be given a plurality of successive forward steps, one step for each operation of the actuator.

2. In a listing machine, the combination with a plurality of type wheels, of an actuator therefor, and means whereby upon successive operations of the actuator the type wheels will be stepped forward singly and successively.

3. In a listing machine, the combination with a plurality of type wheels, of an actuator, and means whereby upon successive operations of the actuator the type wheels will in succession be stepped forward a plurality of times.

4. In a listing machine, the combination with a plurality of type wheels, of an actuator common to all of the type wheels, and means whereby upon successive operations of the actuator, the type wheels will in turn each be stepped forward a plurality of times, one step for each operation of the actuator.

5. In a listing machine, the combination with a plurality of type wheels, of an oscillatory actuator common to all the type wheels, and means whereby repeated successive operations of the actuator will step first one and then another type wheel forward a plurality of times, each type wheel remaining at rest after it has been given its plurality of successive forward steps.

6. In a listing machine, the combination with a plurality of type wheels, of an actuator common to all the type wheels, and adapted to step the type wheels forward singly a plurality of times, and means actuated by each type wheel when it reaches the limit of its movement to bring another type wheel into position to be actuated by the actuator, each type wheel remaining at rest after it reaches its limit of movement.

7. In a listing machine, the combination with a plurality of type wheels, of an actuator common to all the type wheels and adapted to step the type wheels forward singly a plurality of times, and means actuated by each type wheel when it reaches the limit of its movement to bring the next adjacent type wheel into position to be actuated by the actuator, each type wheel remaining at rest after it reaches its limit of movement.

8. In a listing machine, the combination with a plurality of type wheels, of an oscillatory actuator common to all the type wheels, said actuator having operative engagement with one type wheel only when the type wheels are in zero position, whereby said type wheel only will be actuated upon operation of the actuator, and means operative when said type wheel reaches the forward limit of its movement to bring the next type wheel into operative engagement with the actuator, the first type wheel at that time being carried out of operative engagement with the actuator.

9. In a listing machine, the combination with a plurality of type wheels each having a ratchet wheel associated therewith, of a common actuator having a nose to co-operate with each ratchet wheel, said actuator when the type wheels are in a zero position having engagement with one ratchet wheel only, and becoming disengaged from said ratchet wheel when the type wheel has been advanced to the limit of its movement, and means actuated by said type wheel when it reaches the limit of its movement to bring the ratchet for another type wheel into operative engagement with the actuator.

10. In a listing machine, the combination with a plurality of type wheels bearing on their periphery type characters for printing numerals, the type characters constituting the group on each type wheel running consecutively and the groups on the different type wheels also running consecutively, of means for stepping the type wheels forward singly and successively.

11. In a listing machine, the combination with a plurality of type wheels, of an actuator therefor, and means whereby upon successive operations of the actuator the type wheels will in succession be given a plurality of successive forward steps, one for each operation of the actuator.

12. In a listing machine, the combination with a plurality of type wheels, of an actuator therefor, means to establish an operative connection between the actuator and each type wheel in succession, whereby first one type wheel and then another is stepped forward a plurality of times, once for each operation of the actuator.

13. In a listing machine, the combination with a plurality of type wheels bearing on their periphery type characters for printing numerals, the type characters constituting a group on each type wheel running consecutively and the groups on the different type wheels also running consecutively, of a single actuator for all the type wheels, means whereby upon successive operations of the actuator first one type wheel will be stepped forward to the limit of its movement and then will remain at rest while upon further operations of the actuator the second type wheel will be stepped forward to the limit of its movement and so on.

14. In a listing machine, the combination with a group of type wheels each having a toothed member rigid therewith, of an actuator common to all the type wheels, and means whereby upon successive operations of the actuator the type wheels are stepped either forwardly or backwardly singly.

15. In a listing machine, the combination with a plurality of type wheels, of an actuator common to all the type wheels, means for establishing a direct operative connection between the actuator and each type wheel in turn, whereby first one and then another of the type wheels will be stepped forward a plurality of times.

16. In a listing machine, the combination with a plurality of type wheels, of an actuator common to all the type wheels, means for establishing a direct operative connection between the actuator and first one and then another of the type wheels during a plurality of successive operations of the actuator.

17. In a listing machine, the combination with a plurality of type wheels, of an actuator common to all of them, and means for establishing an operative connection between the actuator and one type wheel during a series of successive operations of the actuator, and then disrupting said connection and establishing it between the actuator and another type wheel during a second series of successive operations of the actuator.

18. In a listing machine, the combination with a plurality of type wheels, of an actuator common to all the type wheels, means for establishing an operative connection between the actuator and the various type wheels in turn, the connection between the actuator and each type wheel remaining operative during a plurality of successive operations.

19. In a listing machine, the combination with a printing head having a plurality of type wheels, of a work-supporting table on which a sheet may be supported so that the printing head will make a printed impression along one edge of the sheet, and a pivotally-mounted bell-shaped hold-down member by which the sheet is releasably held during the printing operation, said hold-down member having an adjustable gauge to assist in positioning the sheet.

20. In a listing machine, the combination with a plurality of type wheels, of an actuator common to all the type wheels, a toothed member rigid with each type wheel, an actuator common to all the toothed members but capable of having operative connection with one of them only at any one time, and means whereby upon successive operations of the actuator it will co-operate with one toothed member to step the corresponding type wheel forward a plurality of times, and will then become operatively connected to another toothed member so that upon further successive operations it will step said other toothed member forward a plurality of times.

In testimony whereof, I have signed my name to this specification.

GEORGE H. LANG.